Patented Nov. 12, 1946

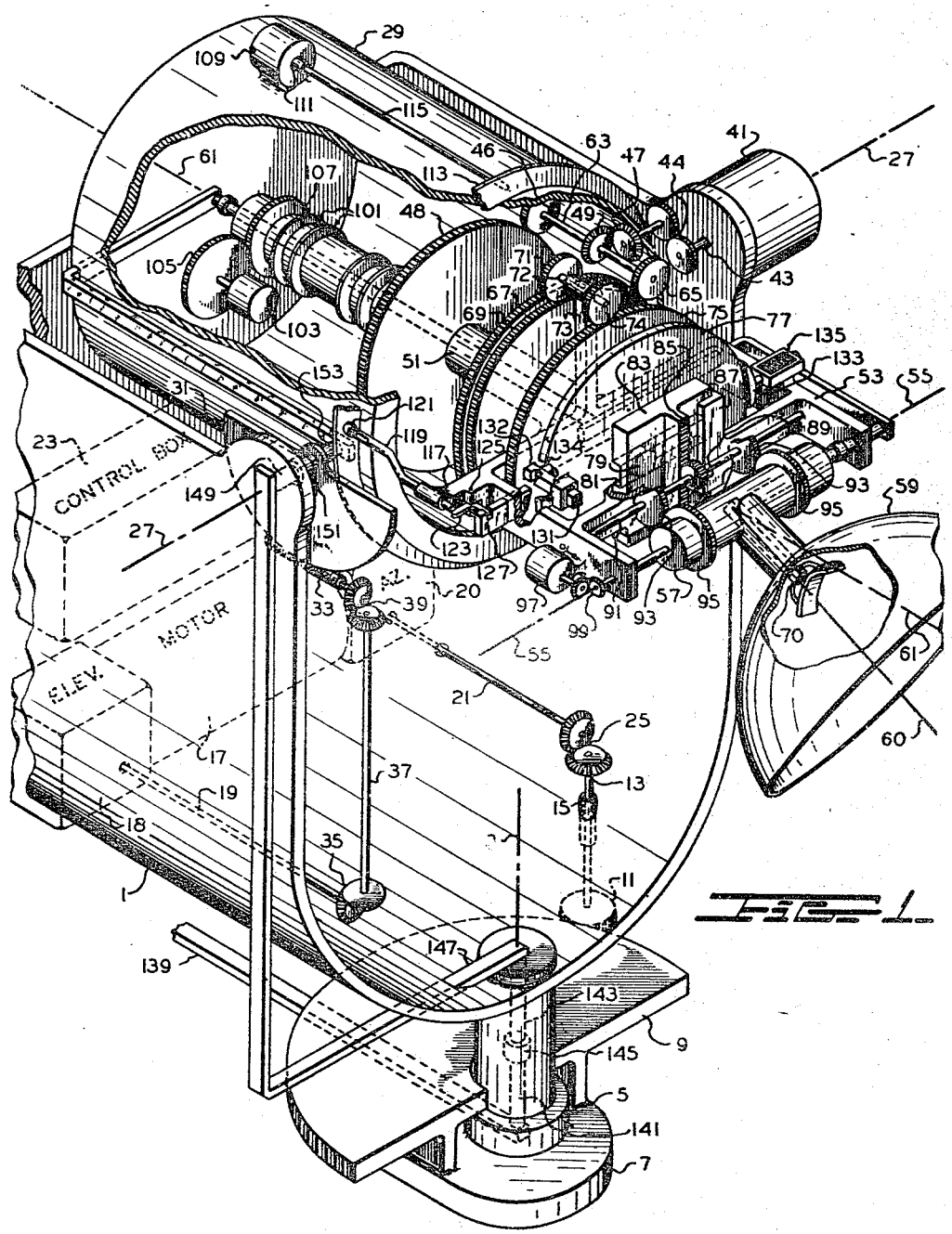

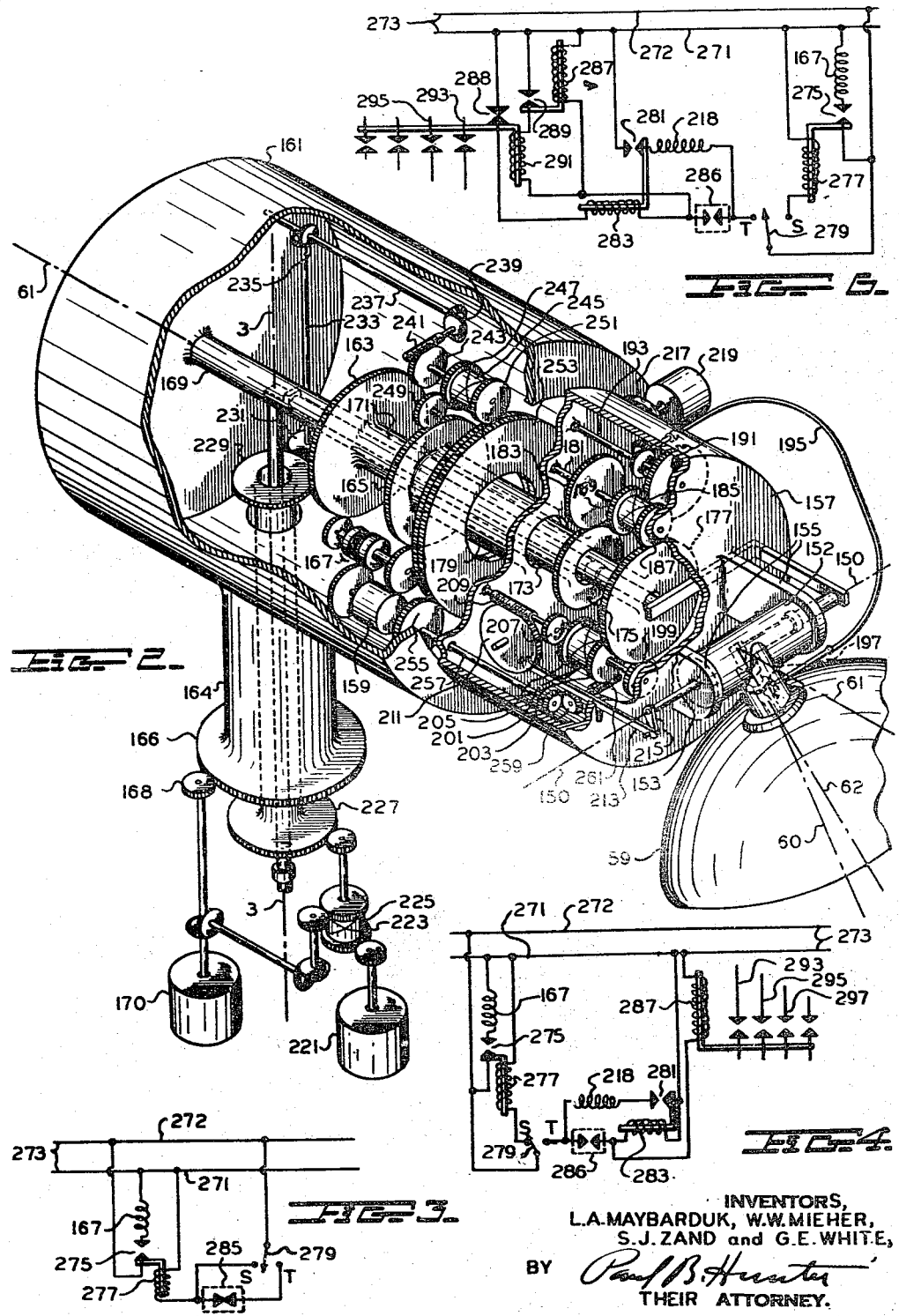

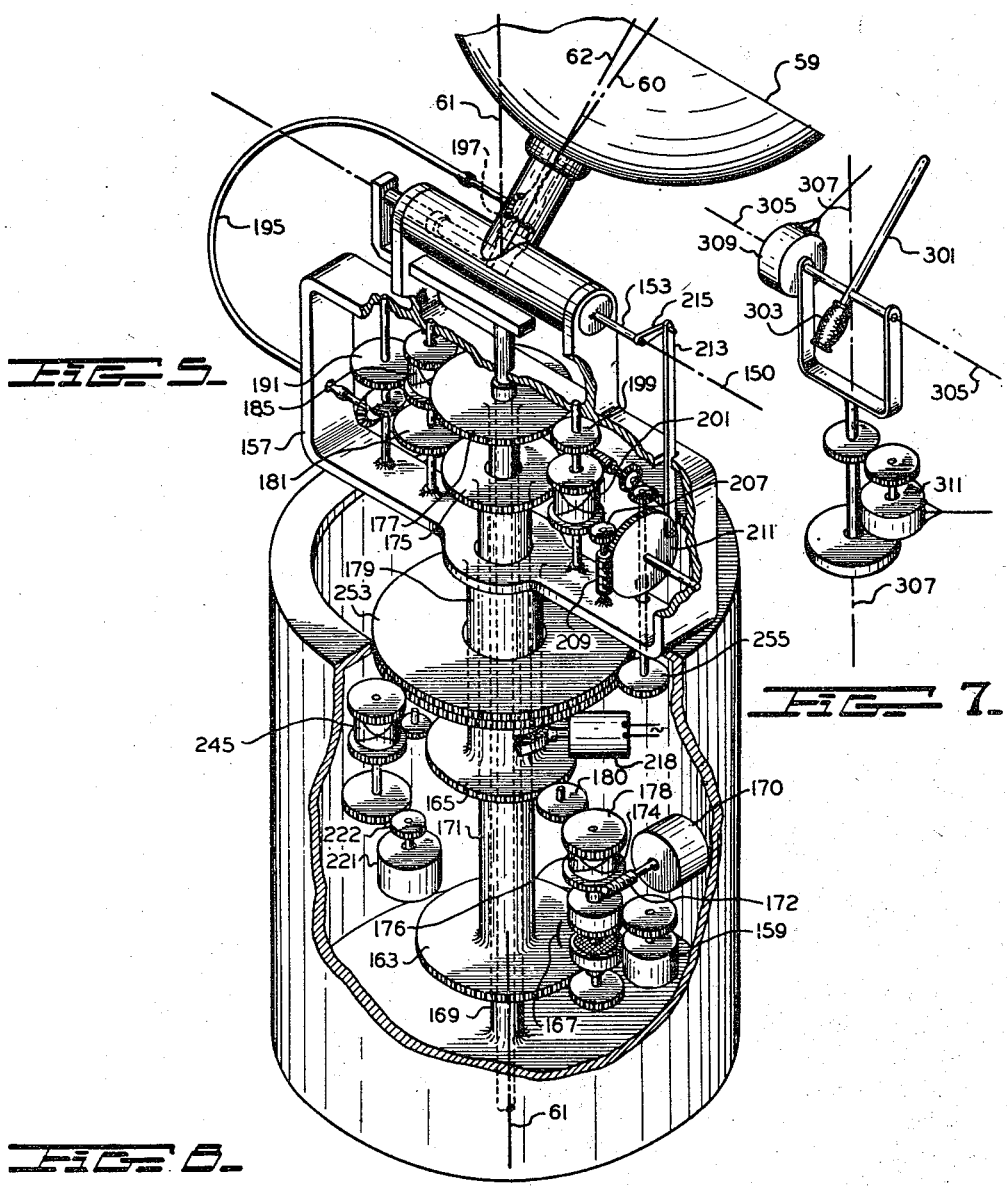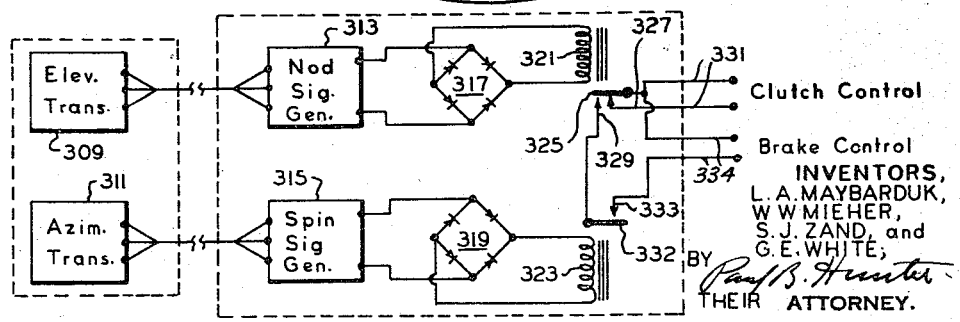

2,410,831

UNITED STATES PATENT OFFICE 2,410,831

SCANNING DEVICE

Leon A. Maybarduk, Forest Hills, Walter W. Mieher, Mineola, Stephen J. Zand, Forest Hills, and Gifford E. White, Hempstead, N. Y., assignors to Sperry Gyroscope Company, Inc., Brooklyn, N. Y., a corporation of New York Application April 10, 1942, Serial No. 438,388

29 Claims. (Cl. 250—11)

The present invention is concerned with devices for scanning a beam of radiant energy, or scanning a directive reception pattern over a predetermined solid angle.

In many applications, such as in object detector, distance measuring, and radio-locating devices, it is desirable to scan a projected beam of radiant energy over a predetermined solid angle usually conical in form in order that the presence and/or distance of a distant object located within that solid angle may be detected and measured by associated apparatus. In such systems it may also be desirable, after such an object has been detected, and its presence indicated, to directly orient the radiant energy transmitting system toward the distant object in order to accurately indicate its orientation, relative to the location of the transmitting system.

According to the present invention such a device is provided, adapted to scan a predetermined conical angle up to and including a complete hemisphere by means of a spiral conical motion of a sharply directed radiant energy beam. This motion is provided by rapidly spinning the radiating system about one axis while slowly nodding the system about a second axis perpendicular to and rotating with the first axis.

In addition to such a spiral scanning or searching operation it is desirable in some systems to convert the spiral scanning, which is generally effective over a wide solid angle, to a type of circular conical scanning having a very narrow apex angle, such as of the order of 2 to 8 degrees, whereby the actual orientation of the distant object may be accurately indicated by suitable indicating systems, such as are shown in copending application Serial No. 441,188, filed April 30, 1942, for Radio gun control system in the name of G. E. White, C. G. Holschuh, W. W. Mieher and J. E. Shepherd. Such a change from spiral to circular scanning may be produced in the present device by interrupting the nodding motion at a point in its cycle at which the axis of the radiated beam is at an angle to the spinning axis equal to half the desired apex angle of the circular scanning, while retaining the spin motion. In the illustration used above this might be, for example, 4 degrees. In this manner, by interrupting the nodding motion and maintaining the spinning motion, the beam is caused to move in a narrow circular conical pattern as desired.

It is further desirable to be able to adjust or vary, in elevation and azimuth, the general orientation of the radiating system, which may be taken to be the orientation of the pole of the spiral scan or the axis of the circular scan, both coinciding with the spin axis, in order that the radiating system may have its center directed in any desired orientation within the range of the system. For this purpose the spinning axis of the radiating system may be made adjustable both in azimuth and elevation, whereby either the circular scanning or the spiral scanning may be directed toward any point of the sphere within the limitations of the system.

Alternatively, such orientation may be desired only during circular scanning, to provide tracking with the distant reflecting object. Then either or both the nod and spin axes may be alternatively used, during circular scanning, as the elevation and azimuth axes, respectively. In such case, the spin motion may be interrupted at the proper point, and the radiating system may be then rotated about a further axis slightly angularly displaced from the beam axis, to thereby provide the circular tracking scanning. Thereafter, the new axis may be oriented in elevation and azimuth by the use of the nod and former spin axes as elevation and azimuth axes, or by independent elevation and azimuth axes.

Accordingly, its is an object of the present invention to provide improved devices for sweeping an orientable member over a predetermined solid angle of space.

It is another object of the present invention to provide improved radio scanners for spirally sweeping a directive radiation pattern over a conical solid angle.

It is a further object of the present invention to provide improved devices for converting one kind of scanning to a different type.

It is still another object of the present invention to provide improved devices for alternatively scanning spirally or circularly.

It is a still further object of the present invention to provide improved scanners for alternatively scanning spirally, as for searching, or circularly, as for tracking, and for adjusting the scanning axis orientation.

It is yet another object of the present invention to provide improved scanning devices adapted to produce spiral scanning of an orientable member by a combination of nodding and spinning motions of this member, and to convert to circular scanning by interruption of the nodding motion.

It is still another object of the present invention to provide improved spiral scanning of an orientable member by a combination of nodding and spinning motions of this member, and to invert to circular scanning by interruption of the spinning motion and initiation of a new spinning motion.

Further objects and advantages will become apparent from the following specification and drawings in which Figure 1 comprises a perspective view of one form of scanner, embodying independent azimuth and elevation controls.

Figure 2 comprises a perspective view of a modified form of scanner in which the nod and elevation axes are combined.

Figure 3 is a wiring diagram of a suitable control circuit for the scanner of Figure 2 for effecting changeover from spiral to conical scanning.

Figure 4 is a wiring diagram disclosing a modification of the control circuit of Figure 3.

Figure 5 is a perspective view showing a further modification of the scanner of Figure 2, combining the spin and azimuth axes.

Figure 6 is a wiring diagram of a control circuit for the scanner of Figure 5.

Figure 7 is a perspective view of a controller for determining the point at which the scanner of Figure 5 is to convert from searching to tracking.

Figure 8 is a wiring diagram of a control circuit for use with the scanner of Figure 5 and controller of Figure 6.

Figure 9:
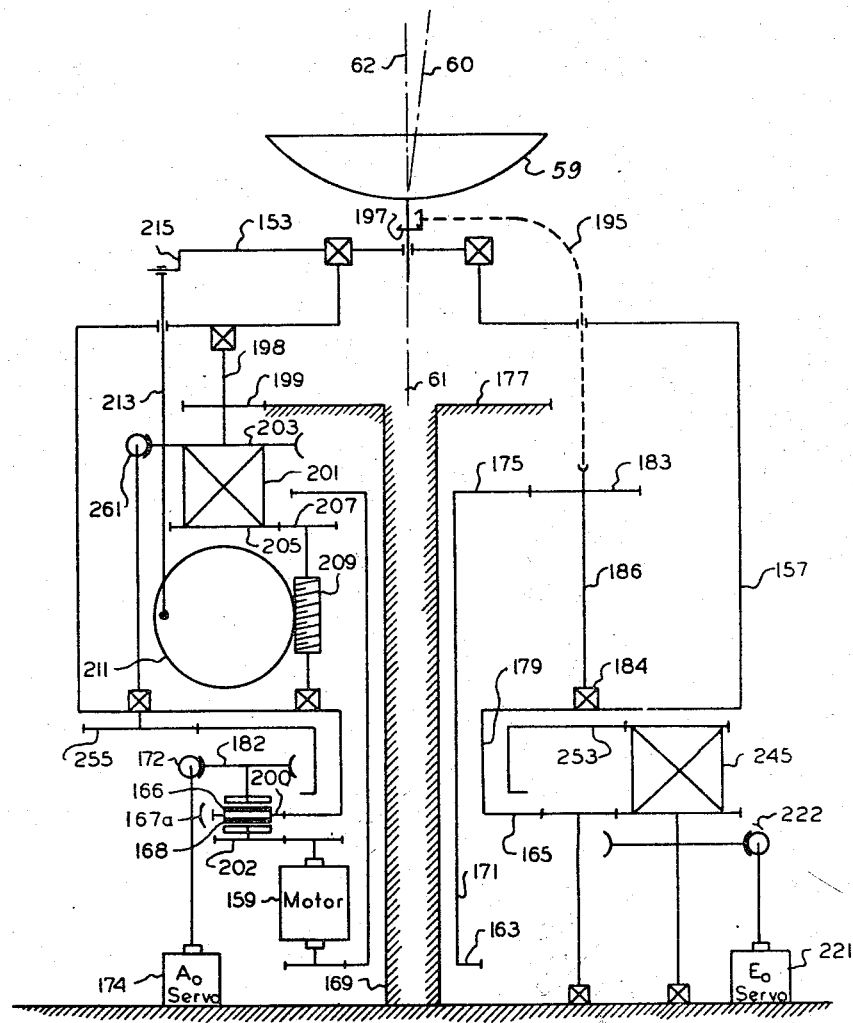
Figure 9 is a diagrammatic view of a modification of the scanner of Figure 5.

Referring to Figure 1, a supporting mount 1 pivotally supported about a vertical axis 3, is on a suitable step or thrust bearing 5 mounted on a fixed support 7. Support 7 also carries fixed to it a horizontal gear 9 which engages with a pinion 11 mounted on a shaft 13 journaled in mount 1 as by a suitable bearing 15. Carried on the supporting mount 1 is a suitable variable speed driving mechanism, illustrated in this instance as being of the variable-displacement hydraulic transmission type, comprising an electric driving motor 17 driving two units 18 and 20 comprising respective variable displacement pumps whose fluid outputs actuate respective hydraulic motors and thereby rotate the respective output shafts 19 and 21.

One of these units, such as 18, is adapted to rotate the radiating system in elevation, as will be seen, and the other unit, such as 20, is adapted to rotate the system in azimuth. The output speeds of shafts 19 and 21 are under the control of a suitable control box 23 adapted to control these shafts 19 and 21 under the influence of a remote controlling station. Such a control box may assume the form shown in copending application Serial No. 417,580, for Remote aircraft turret control mechanism, filed November 1, 1941, in the name of W. C. Hartman, J. A. Peoples, Jr., and H. L. Hull. The control station may be any orientable device, such as a telescope, gun sight, computer, search-light, etc, or any suitable control for producing control signals to actuate control box 23.

Any other type of actuating device may be used, if desired, with any suitable type of control, according to the requirements of a particular application.

Azimuth shaft 21 is coupled directly to shaft 13 as by suitable gearing 25. In this way upon actuation of the azimuth unit 20, pinion 11 is caused to rotate and thereby causes the supporting mount 1 and the radiating apparatus to walk around the fixed azimuth gear 9. The azimuth gear 9 is preferably made in the form of a semicircle in order to clear the path for scanning in a downward direction, as will be apparent from the description below.

Pivoted in supporting mount 1 about a normally horizontal axis, such as axis 27 intersecting azimuth axis 3, is a housing 29 which carries the radiating system and its spinning and nodding operating mechanism. Fixed to the pivot axis of housing 29 is a worm wheel sector 31 driven from a worm 33 which in turn is energized from the elevation output shaft 19 as by way of gearing 35, shaft 37, and gearing 39. In this way, upon energization of elevation control unit 18 and actuation of the output shaft 19, the housing 29 is caused to rotate about a horizontal axis. By the above mechanism, therefore, housing 29 is adapted to be rotated both in elevation and azimuth and may, therefore, be oriented in any desired direction.

Mounted on supporting mount 1 is a driving motor 41 whose output shaft 43 is preferably made concentric with the horizontal pivot axis 27 of housing 29. If desired, motor 41 may be mounted anywhere on housing 29. Shaft 43 passes through a suitable bearing in housing 29 and drives, as by way of gearing 44, a bevel gear 47 which in turn actuates a further bevel gear 49 and a shaft 63 fixed thereto. Shaft 63 drives a large gear 48 through pinion 46. Gear 48 is mounted in housing 29 for rotation about spin axis 61, which is preferably chosen to intersect both elevation axis 27 and azimuth axis 3.

Fastened to gear 48 as by a hub 51 is a yoke 53 which, as will be seen, carries the nod axis 55 about which is pivoted a member 57 carrying the directional radiating system illustrated as comprising a parabolic reflector 59. Nod axis 55 preferably intersects spin axis 61. In this way, power motor 41 supplies the driving power for spinning the parabola 59 about the spin axis 61. The nodding motion of the parabola 59 is actuated from the spinning motion, thereby permitting the same motor 41 to provide power for both spinning and nodding.

Thus, also fixed to shaft 63 and driven therewith from motor 41 is a pinion 65 which meshes with and drives a gear 67 floatingly supported on hub 51. Fixed to gear 67 is a further gear 69, which engages a pinion 71 fastened to a shaft 72 journaled in an extending arm 73 integral with yoke 53. Also fastened to shaft 72 is a pinion 74 which drives a gear 75 having its forward face formed as a driving clutch plate, which cooperates with a driven clutch plate 77 to drive the latter when these two plates are in engagement.

Fixed to driven clutch plate 77 is an eccentric projection 79 cooperating with a slot 81 in a sliding member 83 which carries on its outer face a rack 85. Member 83 is guided by suitable guide slides 87 fastened to yoke 53 and is thereby constrained to move only perpendicularly with respect to the spin axis 61 and yoke 53.

With clutch plates 75, 77 in engagement, the gear ratios are so chosen that driven clutch plate 77 is rotated at a speed different from that of yoke 53, so that eccentric 79, cooperating with slot 81 in slide 83, will cause an oscillatory translational motion of slide 83 and rack 85. Meshing with rack 85 is a pinion 89 oscillated thereby. Pinion 89 is fixed to a shaft 91 journaled within yoke 53 and also carrying gear sectors 93 fixed thereto. Sectors 93 engage with cooperating gears 95 fixed to member 57 carrying parabola 59, and thereby the oscillatory rotational motion of pinion 89 is transferred to parabola 59, which is thereby caused to nod about axis 55. Accordingly, this nod motion combined with the spin motion causes the axis of parabola 59 to sweep out a spiral cone in space, whose outermost limits are determined by the maximum amount of nod as measured with respect to the spin axes.

Preferably the nod and spin rates are so adjusted that energy may be radiated to or received from every point of the conical solid angle within which scanning occurs. For this purpose, the pitch of the spiral, which may be defined as the angular separation between consecutive layers of the spiral, and is therefore equivalent to the change in nod angle per spin revolution, is chosen to be no larger than the angular width of the radiation transmitting or receiving pattern formed by parabola 59. For example, a suitable radiation pattern width has been found to be 4 degrees. Accordingly, the scanner must not change more than 4 degrees in nod for each spin revolution.

Suitable rates of rotation have been found to be 1200 R. P. M. for spin and 30 complete revolutions per minute for nod. In this way a complete cycle comprising two spiral scans, one outward and one inward, over the desired conical solid angle is produced each two seconds, and each spiral scan comprises 20 complete spins. The extent of the conical solid angle may be suitably selected by determining the eccentricity of eccentric in 79 to produce a suitable range of nodding motion, or by properly choosing the gear ratios of sectors 93 and pinions 95. Thus, if it is desired to scan over a complete hemisphere, the system would be adjusted so that the nodding motion of parabola axis 60 takes place between 0 degrees and 90 degrees with respect to the spin axis. For smaller solid angles the limitation in nod would be correspondingly restricted.

The system thus far described, therefore, is capable of performing spiral scanning over a predetermined selected conical solid angle whose axis is adjustable in azimuth and elevation. In order to suitably synchronize an indicator with this scanning motion it is desirable to transmit the instantaneous position of the parabola in terms of its spin and nod components to the indicator. For this purpose a self-synchronous transmitter 97, of any suitable type, such as the "Selsyn," "Autosyn," or "Telegon" type, is coupled directly to the nod axis 55, as by suitable gears 99, to provide signal currents corresponding to the position of the parabola in nod.

In view of the fact that this nod transmitter 97 must be fixed to spinning yoke 53, it is necessary to provide suitable slip rings for connecting these currents to external circuits. Such slip rings are shown at 101, fixed to hub 51 and gear 48, and therefore fixed with respect to transmitter 97. These slip rings may therefore be connected to transmitter 97 by suitable conductors (not shown). Stationary brushes (not shown) mounted within housing 29 may be provided for conducting these currents to the external circuits.

In order to transmit the instantaneous spin position of the parabola to a distant point, a spin transmitter 103, which may be of the same type as nod transmitter 97, is suitably coupled to the spinning part of the system as by suitable gears 105 and 107. No slip rings are necessary for transmitter 103 since it is fixedly mounted with respect to housing 29.

In order to transfer from spiral scanning to circular scanning, as described above, it is necessary in the present instance to interrupt the nod motion of the parabola at the proper point in its cycle of nod. For this purpose there is provided mounted on housing 29 a control solenoid 109 whose coil is fixed to housing 29. The armature 111 of solenoid 109 is fastened to a ring 113 as by a rod 115. Ring 113 is adapted to slide axially along housing 29, and will be so actuated as to move toward parabola 59 upon energization of solenoid 109. If desired, a plurality of solenoids 109 may be disposed symmetrically about housing 29 to produce a proper axial motion of ring 113.

Carried on yoke 53, as by a suitable bracket 117, is a slidable rod 119 having at one end a roller 121 which normally rolls about ring 113. Roller 121 is urged against ring 113 by means of a spring connected between arm 119 and bracket 117, this spring not being shown in the view taken. Arm 119 at its other end is pivoted to a bell crank 123 having a pivot 125 fixed to the yoke 53. The other end of bell crank 123 actuates an interposing knife member 127.

It will be clear from the above description that energization of solenoid 109 will push ring 113 forward, thereby pushing upon arm 119 no matter what the position of yoke 53 might be at the moment of energization, and hence, rotating bell crank 123 and pushing interposing member 127 toward the spin axis.

Interposing member 127 operates to separate driving clutch plate 75 from the driven clutch plate 77. These two clutch plates 75 and 77 are connected to move together by means of a pin 131 which is slidably mounted in driven clutch plate 77 and engages a slot or recess 132 on driving clutch plate 75 to thereby couple the two clutch plates together. Pin 131 is normally urged toward plate 75 and held within recess 132 by a suitable spring, (not shown).

Operation of interposing member 127 acts to remove pin 131 from its recess in driving clutch plate 75 and thereby releases driven clutch plate 77 from its driving source. Thus, pin 131 is formed with a tapered or slanted notch 134. The end of member 127 is also tapered in a similar fashion. When member 127 is moved toward spin axis 61, the motion of pin 131 relative to yoke 53 causes notch 134 to engage member 127. Continued rotation of plate 77 causes pin 131 to ride up on the slanted portion of member 127, and to pull itself out of recess 132. Plate 77 is therefore no longer supplied with driving power, and a friction brake 133, which continuously engages clutch plate 77, under the action of suitable spring 135, is thereby permitted to immediately stop clutch plate 77 in its rotation with respect to yoke 53. Thereafter clutch plate 77 does not move with respect to yoke 53, but spins with it. Hence, eccentric 79 has no relative motion with respect to slide 83, and the nodding motion of the parabola 59 is interrupted.

The relationship between the position of eccentric 79 and slide 81 is so chosen that when pin 131 comes into the position wherein it is engaged by interposing member 127, parabola 59 will be at the position of nod at which it is desired to stop the nodding motion. In this way the spiral scanning may be converted into circular scanning by remote electrical energization of solenoid 109, without affecting in any way the spinning motion of parabola 59 or its orientability in elevation and azimuth.

It will be clear that the present scanning device need not be restricted to the transmission or reception of radio energy, but may be used to transmit or receive other forms of energy, such as light, sound, infra-red rays, etc.

In view of the multiplicity of axes of rotation of the system it is necessary to provide special devices for introducing the energy to be radiated to or for abstracting energy from the parabolic reflector 59. The present device is especially adapted for use with ultra high frequency radiant energy, which can be conveniently conducted by means of hollow wave guides, although it is to be noted that the system is in no way so restricted and that concentric transmission lines or other types of conductors may be used, if desired. However, for the purpose of illustration, the present system has been illustrated as using hollow wave guides for conducting high frequency radiant energy.

Thus, a wave guide 139 leading from the energy source, or to the receiver, is conducted to the base 7 of the apparatus. Preferably such a wave guide is rectangular in form for convenience of construction and use, and to provide desirable electrical characteristics, although it may be of any other suitable shape. At the base 7 wave guide 129 is connected to a circular wave guide 141 concentrically situated with respect to the azimuth axis 3. Suitable types of wave guide couplings for converting from a rectangular wave guide 139 to a circular wave guide 141 are shown in copending application Serial No. 429,494, for Directive antenna structure, filed February 4, 1942, in the name of R. J. Marshall, W. L. Barrow, and W. W. Mieher, and in copending application Serial No. 447,524, for High frequency apparatus, filed June 18, 1942, in the names of W. W. Mieher and J. D. Mallett.

Circular wave guide 141 is fixed to the base 7. A cooperating wave guide 143 is provided fixed to the mount 1 which, as has been described, is rotatable with respect to base 7 about azimuth axis 3. Therefore, between wave guide sections 141 and 143 there is provided a rotatable joint 145 also described in above-mentioned copending applications Serial Nos. 429,494, and 447,524.

Wave guide 143 is again converted by similar waves to a rectangular wave guide 147, which is then conducted to the elevation axis 27, at which point it is again converted to a circular wave guide 149 coaxial with axis 27. This guide 149 is connected as by a rotatable joint 151 to a wave guide section 153 fixed to the spin housing 29. Similar converting devices and rotatable joints are provided about the spin axis 61 and the nod axis 55, eventually leading the radiant energy to the terminating device or antenna 70 within parabola 59. Suitable forms of termination are also shown in copending application Serial No. 429,494.

It is to be noted that any suitable type of high frequency energy conducting apparatus may be provided to energize the radiator 59, the above described system merely being one type which has been found to be suitable.

Figure 2 shows a scanning device functioning similarly to that of Figure 1. In this instance, however, the nod axis and elevation axis have been combined into a single axis such as axis 150, alternatively utilized as a nod axis and as an elevation axis. Thus, parabolic reflector 59 is fastened to a shaft 152 coaxial with an axis 150 and which is journalled in a pair of arms 155 extending from a casing 157. As will be later seen, casing 157 is continuously rotating at the spinning speed, during the spiral scanning operation. At the same time, to produce the spin motion in a manner to be later described, shaft 153 is continuously oscillated about axis 150 thereby producing the nod component of motion of reflector 59.

The motive power for the scanning operation is produced from a suitable motor 159 carried in a relatively stationary housing 161. Motor 159 is adapted to selectively drive a gear 163 or a gear 165, the selection being effected by means of a suitable remotely actuated clutch such as magnetic clutch 167. Gear 163 is floatingly mounted on a hollow stanchion 169 fixed within housing 161 concentric with the spin axis 61. Fixed to gear 163 is a sleeve 171 which passes through an opening 173 in the base of spin casing 157 and terminates in a gear 175. Stanchion 169 extends concentrically beyond gear 175 and terminates in a stationary gear 177. Gear 165 is floatingly mounted upon sleeve 171 and in turn is fixed to a sleeve 179 fixed to spin casing 157.

In this way, upon suitable actuation of clutch 167 to its spiral scanning position, gear 165 is continuously rotated by motor 159, gear 163 remaining stationary. This produces a continuous rotation of casing 157 about the spin axis 61. Journalled within casing 157 is a shaft 181 fixed to a gear 183 engaging with gear 175, now stationary. Shaft 181 drives one member of a suitable mechanical differential 185, another of whose members is actuated by means of a gear 187 engaging stationary gear 177. The third member 189 of differential 185 drives a pinion 191 fixed to a second shaft 193 journalled within casing 157, and thereby rotates a flexible shaft 195 to which the parabola 59 is coupled, as by means of suitable gearing 197, the parabola 59, now being made rotatable about an axis 62 fixedly displaced from the parabola axis 60 by the amount of nod needed for circular scanning, as will be seen.

Thus, assuming that clutch 167 is in the position corresponding to the spiral searching operation, motor 159 will continuously rotate gear 165, sleeve 179 and casing 157 at the spin rate and about the spin axis. Gear 163, sleeve 171 and gear 175 will be stationary. Gear 177 is also stationary. Accordingly, as casing 157 rotates about gears 175 and 177, a corresponding rotation of gear 183 and gear 187 will be produced. Hence two members of differential 185 are driven. Differential 185 and its associated gearing are so arranged that under these conditions no rotation of gear 191 and shaft 193 with respect to casing 157 is produced. Accordingly, flexible shaft 195 does not rotate and parabola 59 is fixed relative to shaft 153. However, spin motion is produced by the rotation of spin casing 157.

Also engaging with stationary gear 177 is a pinion 199 which actuates one member of a mechanical differential 201. A second member 203 of differential 201 is actuated in accordance with the elevation control of the scanner as will be later seen, but during searching operations is maintained stationary. Accordingly, during searching, any motion of gear 199 will be transmitted directly to the third member 205 of differential 201, which, through pinion 207, worm 209, worm wheel 211, link 213 and crank 215 serves to oscillate shaft 153 about the nod axis 150, producing motion of the parabola 59 in nod. Motion of pinion 199 is produced during searching by rotation of casing 157 about stationary gear 177, thereby producing the nod component of motion of parabola 59. The various gear ratios involved are so chosen and the link mechanism is so selected that a suitable range and rate of nod is produced according to the requirements of the particular problem at hand. In this way, the same type of spiral scanning is produced to effect searching as described with respect to Figure 1.

Continuously engaging spinning casing 157 is a brake 217 held against casing 157 by means of a suitable spring 219. It will be clear that a plurality of such brakes and springs will ordinarily be used symmetrically disposed about casing 157. Brake 217 is insufficient of itself to affect the motion of casing 157 during searching, when casing 157 is driven by motor 159. However, should casing 157 be disengaged from motor 159, brake 217 would be immediately effective to stop rotation of the casing 157.

Thus, upon actuation of clutch 167 to the opposite or tracking position, gear 165 is no longer driven from motor 159. Accordingly, the source of power is removed from casing 157, which is immediately brought to a standstill by brake 217. At the same time, gear 163, sleeve 171 and gear 175 are set into rotation. Since casing 157 is no longer rotating, member 187 of differential 185 is no longer actuated and is held motionless by fixed gear 177. Accordingly, the rotation of gear 175 is transmitted to gear 183, shaft 181 through differential 185 to gear 191 and through flexible shaft 195 to the parabola 59 thereby maintaining the spinning motion of parabola 59 either at the same rate as the previous spinning motion, or at a higher rate as may be desired. It will be noted that parabola 59 now rotates about an axis 62 which is not necessarily coincident with spin axis 61.

The immobilizing of casing 157 also causes gear 199 to stop rotating. Since member 203 of differential 201 is also motionless, no motion is transmitted through gear 207 and thereby to shaft 152. Accordingly, the motion of parabola 59 in nod has been stopped and the only resultant motion is the spinning motion of parabola 59 about its new spin axis 62, which in this instance, may be different from the normal axis of spinning 61 by virtue of the fact that the nodding motion may be interrupted at any desired point.

In order to produce the very small circular scanning described with respect to Figure 1, preferably the axis 60 of the beam radiated from or received by parabola 59 is offset slightly with respect to the new spin axis 62 in order that the beam may sweep through the narrow circular cone described above.

It is usually desirable to interrupt the spiral searching scanning and initiate the circular tracking scanning at an instant such that the axis of the resulting circular scanning will coincide with the orientation of the distant object to be detected.

In order to accomplish this, the entire device thus far described while spirally searching is oriented in azimuth by a separate control to be described, until the azimuth of the spinning axis 61 coincides with the azimuth of the distant object. When this has been adjusted, the nodding motion is interrupted at the instant that the amount of nod corresponds to the elevation of the distant object, and thereafter the new circular scanning will have its spin axis 62 oriented towards the distant object as required.

To produce the desired motion in azimuth, the housing 161 is mounted for rotation about a vertical azimuth axis such as axis 3 and is fixed to a supporting member 164 to which is also fastened a gear 166. Gear 166 is adapted to be driven by a pinion 168, which, in turn, is actuated from a suitably controlled azimuth servo motor or other servo device 170 adapted to be controlled in any desired manner. Servo 170 may be of the form shown in Figure 1, or any other well-known type.

It will be clear that this azimuth control will remain effective during both the spiral searching scanning and the circular tracking scanning just described. However, after circular scanning is initiated, it is desirable also to be able to adjust or vary the orientation of the spin axis 62, in elevation. For this purpose, an elevation servo unit 221, which may be of the same type as servo 170, actuates one member 223 of a compensating differential 225 to be described.

The output of differential 225 rotates a suitable sleeve 227 formed concentrically within supporting member 164. Sleeve 227 terminates in a gear 229 within housing 161 and its rotation is transmitted by way of a pinion 231, shaft 233, gearing 235, shaft 237, gearing 239, worm 241 and gear 243 to one member of a differential 245. A second member 247 of differential 245 is driven from gear 165 through an idler gear 249. The third or output member 251 of differential 245 actuates a gear 253 floating about the search spin axis 61. Gear 253 actuates a pinion 255 fixed to a shaft 257 which is journalled within the spinning casing 157. Shaft 257 operates through gearing 259 and worm 261 to actuate the member 203 of differential 201 heretofore described.

During the spiral searching scanning operation servo 221 is generally stationary, which thereby immobilizes sleeve 227, gear 229, pinion 231 and member 243 of differential 245. At the same time, gear 165 continuously rotates member 247 of differential 245 through idler pinion 249. The resulting operation is such that gear 253 is rotated by differential 245 at the same rate and in the same direction as casing 157. Because of this, shaft 257 is rotating about search spin axis 61 at the same rate as pinion 253, resulting in no rotation of gear 255 and a consequent immobilization of member 203 of differential 201, whose effect has already been described.

Hence, during the spiral scanning, the stationary elevation control described above has no effect upon the operation of the scanner. However, after spiral scanning has been stopped and casing 157 rendered stationary, any motion of the output of elevation servo unit 221 will be transmitted through differential 225, sleeve 227, gear 229, shaft 231, etc., to member 243 of differential 245. Gear 165 is now held stationary by the action of brake 217 on casing 157, and accordingly the motion of member 243 of differential 245 will be transmitted directly to gear 253 and thence to gear 255, shaft 257, gearing 259, worm 261, differential 201, pinion 207, worm 209, worm wheel 211, link 213, crank 215 to displace shaft 153 about the nod axis 151. In this way, the orientation of parabola 59 with respect to the nod axis 151 may be adjusted, and in effect, the nod axis 151 becomes the elevation axis.

The radiant energy may be fed to or led from the antenna 59 in a manner similar to that described with respect to Figure 1, preferably using circular wave-guides wherever rotating joints are necessary and rectangular wave-guides wherever bends or angles are required. Such a wave-guide system is shown in Figure 2 but need not be further described.

Differential 225 acts to compensate the elevation control for any motion in azimuth. Thus, i the scanner is rotated in azimuth about axis 3, pinion 231 will walk around stationary gear 229, thereby producing rotation of shaft 233 and consequent change in elevation. To prevent this, differential 225 causes gear 229 to rotate by the proper amount to keep shaft 233 stationary, and thus compensate for the azimuth motion in its effect on elevation adjustment.

It will be clear that azimuth, spin and nod-elevation self-synchronous transmitters may be suitably coupled to these respective axes to remotely indicate the instantaneous attitude of the scanner with respect to these axes, if desired.

If desired, gear 163 may be continuously driven from motor 159 at all times. This would cause a continuous rotation of parabola 59 about its spin axis 62, at the same rate as the rotation about axis 61, thereby distorting the spiral scan slightly, but not materially, because of the small angle of the spinning of parabola axis 61 about spin axis 62. In this case, clutch 167 would only act to engage or disengage gear 165 from motor 159, the operation otherwise being as described above.

For proper operation as described above, it is necessary that casing 157 be stopped with nod axis 150 substantially horizontal, and that the nod motion of parabola 59 be stopped at the proper elevation of the distant object. As described above, the scanner, while spirally searching, is preferably oriented in azimuth until the azimuth of search spin axis 61 is the same as that of the distant object, as shown on any suitable indicator, one type being described in the above-mentioned copending application Serial No. 441,188. As therein described, periodic pulses of radiant energy may be transmitted from the radiating system 59, being reflected by any objects within the scanning range. A cathode ray indicator is used in which an electron beam is spirally actuated in synchronism and correspondence with the motion of the scanner. Reception of a reflected pulse causes momentary brightening of the beam trace, indicating by its position on the cathode ray screen, the orientation of the distant object. The orientation of the search spin axis 61 corresponds to the center of the screen. Accordingly, the operator need merely actuate azimuth servo 170 until the azimuths of spin axis 61 and the distant object are the same, thereby assuring that when the scanner axis 60 sweeps across the object, the nod axis is horizontal. The operator must then stop the spiral scanning at the point where the scanner is oriented in nod toward the distant object. This may most simply be done by interrupting the spiral spin and nod at the instant that a reflected pulse is received, when, since scanner and object are already lined up in azimuth, the scanner nod position will be substantially identical with the elevation of the object.

One type of apparatus for producing this result is schematically shown in Figure 3, by suitable control of clutch 167. Thus clutch 167 has one terminal connected directly to one side 271 of a power line 273, the other terminal being connected to the other line side 272 through contacts 275 of a relay 277. During searching, relay 277 is energized through switch 279 in its left or "search" position, so that contacts 275 are open, thereby deenergizing clutch 167 and engaging gear 165 to be driven by motor 157 to perform spiral search scanning. When circular tracking scanning is desired, switch 279 is thrown to the right or "tracking" position, thereby placing relay 277 in series with contacts 285. These contacts are normally closed, so as to maintain searching, but are opened in any known manner in response to reception of a reflected pulse from the distant object, whereupon relay 277 is deenergized, closing its contacts 275 and energizing clutch 167, so that gear 165 is disengaged from motor 157, and is halted by brake 219. Energization of clutch 167 now causes motor 157 to drive gear 163 and perform the circular scanning already described. The control for contacts 285 may be of any well known type, and is preferably of the quick-open, delayed-close type, whereby circular tracking scanning is maintained so long as reflected pulses are received. Relay 277 is also preferably made to be quick-opening and delayed-closing, to prevent needless chattering between searching and tracking. Thereafter tracking with the distant object in elevation and azimuth may be effected by suitable control of servos 221 and 170, respectively.

Figure 4 shows a modified circuit for performing the transfer between scanning and tracking, now replacing continuously acting brake 219 with a solenoid operated brake 218. Thus, clutch 167 has one terminal connected to side 271 of power line 273. The other terminal of clutch 167 is connected to side 272 of line 273 through contacts 275 of time delay relay 277, whose winding is adapted to be directly energized from power line 273 when transfer switch 279 is thrown in the left "search" position.

Time delay relay 277 is preferably of the quick-open, delayed-close type, and, upon its energization, clutch 167 is deenergized through opening of contacts 275. This occurs in the left or "search" position of switch 279. Under these conditions brake 218 is deenergized, since it is connected in series with switch 279 when in the tracking position and also in series with relay contacts 281, whose energizing coil 283 has one terminal connected to line 271 and its second terminal connected through radio controlled contacts 286 to terminal T of switch 279.

Accordingly, in the searching position, clutch 167 is deenergized and brake 218 also is deenergized, resulting in the spiral scanning or searching operation described above. Upon switching to the "tracking" position of switch 279, clutch 167 is energized, thereby disconnecting the drive for the nodding motion as described above. However, due to the inertia of the various moving parts, spiral scanning will continue until brake 218 is energized. Brake 218 is under the control of contacts 281 of relay 283. This relay in turn is under the control of radio-controlled contacts 286. Contacts 286 are placed under the control of the received pulses, that is, are adapted, in a manner well known, to close only at the time when pulses are received from the distant reflecting object, and to remain closed for a fixed interval after the last pulse received.

Accordingly, before throwing the switch 279 to the tracking position, the operator will orient the scanner in azimuth by means of a suitable control of azimuth, servo unit 170 until the azimuthal orientation of the spin axis 61 is the same as the azimuth of the distant object. Thereafter, he may throw the switch 279 to the tracking position at any desired moment. At the first instant after the switching operation that the parabola axis 60 is directed at the distant object, a reflected pulse will be received by the system and contacts 286 will close, thereby energizing relay winding 283 and closing its contacts 281 and so energizing brake 218 which thereupon stops the spiral scanning motion.

It will be clear that in this position the nod displacement of the parabola axis 60 will be substantially the actual elevation of the distant object and that thereafter elevation control during the circular scanning used in tracking may be obtained by suitable adjustment about the nod axis under the control of the elevation servo 221 as described above.

Closing of contacts 286 also energizes a time delay relay 287 controlling a series of contacts 293, 295, 297, etc., which may serve to control the changeover operation from searching to tracking of the remaining parts of the system, such as the radio circuits, indicator circuits, servo circuits, etc., as described more in detail in copending application Serial No. 441,188. In this way there is provided a scanning unit similar in operation to that of Figure 1, but combining nod and elevation axes into one axis.

It is to be noted that the device of Figure 2 reaches its greatest utility when scanning over a solid angle having a horizontal axis, in distinction to the device of Figure 1, wherein any solid angle within the azimuth and elevation range of variation of the device may be scanned. However, the device of Figure 2 need not be so restricted, since axis 3 may be oriented as desired. In such case, however, rotation about axis 3 is no longer true azimuth variation, an axis 150 no longer represents a true elevation axis, but rather instead of elevation and azimuth there are used two other independent coordinates having no well-defined description.

Figure 5 shows a still further modified scanner, useful mainly where the range of the instrument is to be restricted to a fixed hemisphere. Here the nod and elevation axes have been combined into one axis and the spin and azimuth axes have also been combined into a single axis. The constructional details and type of operation of the scanner of Figure 5 are quite similar to that of Figure 2 and like parts will be given the same reference numerals.

Thus, a stationary stanchion 169 is provided preferably concentric with the now combined spin and azimuth axes 61 and carrying a stationary gear 177 at its upper end. Rotatably supported on stanchion 169 is a floating gear 163 fixed to a sleeve 171 at whose upper end is fastened a gear 175. Rotatably supported on sleeve 171 is a further gear 165 fixed to a sleeve 179 carrying at its upper end the spinning casing 157 shown in this instance as being formed simply of an open yoke rather than a closed housing, as in Figure 2. Drive motor 159 in cooperation with electromagnetic clutch 167 is adapted to selectively drive either gear 163 or gear 165, according as tracking or searching is to be performed.

Considering for the moment the searching operation, clutch 167 is actuated to drive gear 165 from motor 159 through differential 176, whose member 174 is held stationary by irreversible worm 172, thereby spinning yoke 157. At the same time, gear 163, sleeve 171 and gear 175 are stationary, and therefore flexible shaft 195 is prevented from rotating in the manner described with respect to Figure 2. However, pinion 199 is caused to rotate, thereby driving through differential 201, pinion 207, worm 209, worm wheel 211, link 213 and crank 215 to operate the nod shaft 153 and thereby cause nodding of the parabola 59 about the nod axis 150, at the same time that spinning is produced by rotation of spinning yoke 157 about the spin axis 61. In this manner, spiral scanning is performed.

For tracking and circular scanning, clutch 167 is actuated to its other position and magnetic brake 218 is momentarily energized, thereby stopping yoke 157 and rotating gear 163. Since yoke 157 is now stationary, pinion 199 no longer rotates and both the spin motion of yoke 157 and the nod motion are interrupted. However, motion in elevation derived from elevation servo 221 through gearing 222, differential 245, gear 253 and pinion 255 causes control of the nod-elevation axis 153 in a manner already described with respect to Figure 2, brake 218 by this time being deenergized.

Rotation of gear 163 now causes rotation of sleeve 171 and gear 175, thereby rotating gear 181 and acting through differential 185 to rotate gear 191 and thereby flexible shaft 195 to spin the parabola 59 in its circular scanning about new spin axis 62.

In order to control the rotation of the parabola orientation in azimuth, azimuth servo 170 now drives a worm 172 engaging one element 174 of a differential 176. This serves to rotate pinions 178 and 180 engaging gear 165 and thereby adjusts yoke 157 in azimuth. Combined azimuth-spin and combined nod-elevation self-synchronous transmitters may be provided here also.

From the foregoing, it will be seen that in transferring from searching to tracking the spinning motion of spinning yoke 157 must be stopped, but then yoke 157 must be left free for motion in azimuth. Accordingly, the braking action must be only momentary. Also the nod motion must be interrupted when parabola axis 60 is directed at the distant object as in Figure 2.

Figure 6 shows a suitable control circuit for producing these desired results, similar in many respects to Figure 4. Here again switch 279 when in the search position keeps clutch 167 deenergized by energizing relay 277 which maintains contacts 275 open. Upon switching to the tracking position of switch 279, relay 277 is deenergized, closing contacts 275 and energizing clutch 167 to convert from search to track. When radio-controlled contacts 286 similar to those of Figure 4 are closed, relay 283 is energized, contacts 288 of relay 291 being normally closed. Thereby contacts 281 are closed, energizing brake 218 and stopping the spin motion of yoke 157.

Closing of radio contacts 286 also energizes time delay relay 287, whose contacts 289 close after a predetermined time interval, thereby energizing relay 291, which acts to open contacts 288 as well as to close contacts 293, 295, etc. Opening of contacts 288 deenergizes brake 218, which therefore acts only momentarily, for a time sufficient to fully stop yoke 157. Thereafter yoke 157 is free to be actuated by azimuth servo 174 for azimuth tracking control.

Here also, gear 163 may be continuously operated by motor 159, in the same manner as with respect to Figure 2.

Figures 7 and 8 illustrate another method of correctly determining the exact point at which the spiral searching scanning should be converted to circular tracking scanning. Thus, it may be desirable to determine in advance the orientation, in azimuth and elevation, for example, at which it is desired to stop the spiral scanning of the scanner of Figure 5 and convert its motion to circular scanning for tracking purposes. Thus, in Figure 7 is shown a manually orientable direction-indicating member 301, having a handle 303 adapted for manual manipulation. Direction-indicating member 301 is adapted to be oriented about a horizontal axis 305 corresponding to an elevation axis, and a vertical axis 307 corresponding to an azimuth axis. Coupled to each of these axes are respective self-synchronous transmitters 309 and 311 of any of the well-known types, which are thereby adapted to transmit to a remote point signal currents representing the respective orientation of direction indicator 301 in elevation and azimuth.

In operation, the required or desired orientation of the scanner of Figure 5 may be determined by any suitable means, such as the cathode ray indicator described above. After this orientation is determined, member 301 is oriented correspondingly. This may be done by means of suitable scales indicating angular elevation and angular azimuth, or by matching member 301 with the indication of the cathode ray indicator in any suitable manner.

As shown in Figure 8, the elevation transmitter 309 is connected to the nod self-synchronous device 313, acting in this instance as a signal generator, to produce in its output an alternating voltage having a magnitude corresponding to the difference in orientations of scanner axis 60 and member 301 in elevation.

In a similar manner, azimuth transmitter 311 is connected to the spin self-synchronous device 315 of the scanner of Figure 5, serving also as a signal generator producing an alternating voltage having an amplitude corresponding to the difference in the orientations of the scanner axis 60 and member 301 in azimuth.

These two displacement or difference voltages are rectified in suitable respective rectifiers, such as 317 and 319, to obtain corresponding unidirectional voltages which thereupon maintain respective relay windings 321 and 323 energized as long as the orientations differ. Relay winding 321 cooperates with a relay armature 325 and two fixed contacts 327 and 329. While relay winding 321 is energized, armature 325 breaks contact with fixed contact 327, thereby maintaining in an open condition the control circuit for clutch 167 connected to wires 331, and de-energizing clutch 167 to effect spiral searching. Upon deenergization of relay winding 321, armature 325 makes contact with fixed contact 329, to condition the energizing circuit of brake 218, as will be seen. Also, armature 325 makes contact with contact 327 and energizes clutch 167.

Relay 323 cooperates with armature 332 and a fixed contact 333. When relay winding 323 is energized, armature 332 and contact 333 are open-circuited. Upon deenergization of relay winding 323, armature 332 makes contact with fixed contact 333. When contacts 325, 329 and 332, 333 are closed, the control circuit of brake 218, connected thereto as by wires 334, is then closed and brake 218 becomes energized.

From the above it will be clear that the voltage or current applied to relay winding 321 can become zero only when the nod position of parabola 59 is the same as the elevation setting of member 301. When this occurs, armature 325 of relay 321 closes the clutch control circuit by engaging fixed contact 327. By this action, motor 159 is disengaged from spin yoke 158 and parabola 59 becomes actuated by flexible shaft 195, as described above, to start its tracking scanning. However, due to the inertia of the various parts of the system, the spin motion about axis 61 will continue for several revolutions. During this time the output of spin signal generator 315, and accordingly the current supply to relay winding 323, will vary from maximum to zero several times as the azimuthal position of parabola 59 passes through the position of correspondence with that of member 301. If the speed of rotation of scanner 59 about spin axis 61 at the instant the current in relay winding 323 becomes zero is quite rapid, armature 332 does not have time to fall out before it is again held in by the reenergizing of relay winding 323. However, due to frictional effects, the speed of rotation is continually decreasing and eventually a point is reached at which this speed is slow enough to permit armature 332 to make contact with fixed contact 333. When this is done, since contacts 325 and 329 are already closed, brake 218 will be energized and the spinning motion about axis 61 will be instantly stopped. In this way brake 218 need not absorb the full rotational spin energy. Since at this moment both the signal output from nod signal generator 313 and speed signal generator 315 are zero, it will be clear that the orientation of the parabola 59 will be substantially the same as that of member 301, the only difference being occasioned by the change in nod caused by the coasting period. This may be made small by providing a suitable damping or friction brake continuously engaging the spinning part of the device, as in Figure 1. The coasting period is desirable in order to prevent large stresses due to too rapid deceleration, and to assure accurate stopping. In this manner the scanner of Figure 5 may be converted from the spiral searching scanning to circular tracking scanning at any desired orientation under the control of direction-indicating member 301. A suitable device for deenergizing brake 218 after the scanner has begun conical scanning is also provided as in Figure 6.

It will be clear that it is not necessary to use the particular type of control member shown in Figure 7. Thus, control member 301 may be replaced by a telescope, sound locator, gun director, a computing gun sight, or any other orientable device.

Figure 9 shows a modification of the scanning system of Figure 5 adapted to produce the same functions in a somewhat simpler manner. In this modification the changeover clutch 167a is provided with two energizing coils, such as 166 and 168. When coil 168 is energized, floating gear 200 is actuated from gear 202 driven from motor 159, corresponding to the searching operation. When coil 166 is energized gear 200 is instead actuated from worm wheel 182 driven from the azimuth servo 174, corresponding to the tracking operation. During searching, motor 159 actuates gears 202 and 200 and thereby drives gear 165 and the yoke 157 carrying the nod axis 153 as before, and thus providing the spinning motion of parabola 59. At the same time motor 159 drives gear 163, sleeve 171 and gear 175 at the same angular velocity as yoke 157. Accordingly, gear 183 meshing with gear 175 and having its bearing 184 fixed to yoke 157, will not be rotated, since its shaft 186 is carried around gear 175 by yoke 157 at the same speed as the speed of rotation of gear 175 itself. Accordingly, for this condition of operation flexible shaft 195 fixed to gear 183 will not be rotated, and the parabola 59 will remain stationary about axis 62.

The motion of spinning yoke 157 causes gear 199, mounted on a shaft 198 rotatably mounted within yoke 157, to rotate about a stationary gear 177 fixed to stationary stanchion 169. This rotation of gear 199 is led through differential 201, gear 207, worm 209, worm wheel 211 eccentrically pivoted link 213 and crank 215 to supply the nod motion of the parabola in a manner similar to that shown in Figures 2 and 5, it being understood that the third member 203 of differential 201 is held stationary by means of the elevation servo 221 as described with respect to prior Figures 2 and 5.

To convert to the tracking operation, clutch section 168 is deenergized and clutch section 166 is energized, the energizing means being as shown in Figures 3, 4, 6, or 8. Under this condition of operation motor 159 still drives gear 163 and hence gear 175 continues to rotate. However, yoke 157 is no longer continuously driven from motor 159 and has had its rotation stopped by means of a brake similar to brake 218 of the preceding figures. Accordingly, the spinning motion of yoke 157 is interrupted, and thereby the nod motion is also interrupted, in the manner already described with respect to Figures 2 and 5. However, rotation of gear 175 now rotates gear 183 actuating flexible shaft 195 and gearing 197, spinning the parabola about axis 62 to provide the circular tracking scanning of the same type as that produced by the preceding Figures 2 and 5. Control of the scanner orientation during tracking in azimuth is derived from the azimuth servo 174 which actuates worm 172, worm wheel 182 and gear 200 (clutch section 166 now being energized) whereby the position of the yoke 157 may be adjusted under the control of azimuth servo 174. The elevation servo 221 operates as before through worm and worm wheel arrangement 222, differential 245, gear 253, gear 255, and worm and worm wheel arrangement 261, 203 to control differential 201 and thereby through gear 207, worm 209, worm wheel 211, link 213 and crank 215 to control the positioning of the spin axis 62 in nod about axis 153.

Suitable nod-elevation and spin-azimuth self-synchronous transmitters may be coupled to axes 153 and 62 or 61, as desired.

It will be clear that, if desired, stanchion 169 may be made rotatable about an axis perpendicular thereto and azimuth servo 174 may be made effective to control the position of stanchion 169 (and hence spin axis 61) about this perpendicular axis in the manner similar to Figure 2 so that the simplification effected by the device of Figure 9 may be applied to the device of Figure 2, as well as to Figure 5, as illustrated.

The control of clutch 167a may be the same as in Figures 3, 4, 6, or 8, merely requiring a further contact on the clutch control relay described to cause energization of clutch section 166 at the same time that section 168 is deenergized, and vice versa.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. A scanning device comprising directional antenna means, a yoke, means for pivotally mounting said antenna means on said yoke for oscillation about a first axis, means for rotating said yoke at a predetermined rate about a second axis perpendicular to said first axis, a clutch having a driving member and a driven member each rotatably mounted concentrically with respect to said second axis, means for actuating said driving member from said rotating means at a rate different from said predetermined rate, an eccentric and slide arrangement actuated by said yoke and said driven member for producing an oscillatory translational motion with respect to said yoke, means for oscillating said antenna means about said first axis by said last motion, a pin slidably mounted in one of said clutch members and normally engaged in a recess in the other of said members for engaging said two clutch members, a slanted notch formed in said pin, a knife member slidably mounted in said yoke and adapted when actuated to withdraw said pin from said recess upon interaction with said slanted notch, stationary means for actuating said knife member to disengage said clutch and thereby stop said oscillatory motion, and means for orienting said second axis in azimuth and elevation.

2. A scanning device comprising directional antenna means, a yoke, means for pivotally mounting said antenna means on said yoke for oscillation about a first axis, means for rotating said yoke at a predetermined rate about a second axis perpendicular to said first axis, a clutch having a driving member and a driven member each rotatably mounted concentrically with respect to said second axis, means for actuating said driving member from said rotating means at a rate different from said predetermined rate, an eccentric and slide arrangement actuated by said yoke and said driven member for producing an oscillatory translational motion with respect to said yoke, means for oscillating said antenna means about said first axis by said last motion, means for disengaging said clutch whereby said oscillatory motion is halted, and means for orienting said second axis in azimuth and elevation.

3. A scanning device comprising directional antenna means, a support, means for pivotally mounting said antenna means on said support for oscillation about a first axis, means for rotating said support at a predetermined rate about a second axis perpendicular to said first axis, a clutch having a driving member and a driven member, means for actuating said driving member from said rotating means at a rate different from said predetermined rate, means actuated by said driven member for oscillating said antenna means about said first axis, and means for disengaging said clutch whereby said oscillatory motion is stopped while retaining said rotational motion.

4. A scanning device comprising directive antenna means, means for pivotally mounting said antenna means for oscillation about a first axis, means for spinning said first axis about a second axis perpendicular thereto, means for simultaneously oscillating said antenna means about said first axis, and means for stopping said oscillatory motion while retaining said spinning motion.

5. A scanning device comprising directive antenna means, means for pivotally mounting said antenna means for oscillation about a first axis, means for spinning said first axis about a second axis perpendicular thereto, and means for simultaneously oscillating said antenna means about said first axis.

6. A scanning device comprising directive antenna means, means for mounting said antenna means for rotation about a first axis rigidly fixed with respect to the directivity axis of said antenna means, means for pivotally supporting said first axis for oscillation about a second axis perpendicular to said first axis, means for rotatably supporting said second axis about a third axis perpendicular to said second axis, means for rotating said antenna means about said third axis and for oscillating said first axis about said second axis while maintaining said antenna means stationary with respect to said first axis, means for orienting said third axis in azimuth, means for stopping said rotation and oscillation at a predetermined orientation of said antenna means with said second axis substantially horizontal and for simultaneously initiating rotation of said antenna means about said first axis, and means for adjusting the orientation of said antenna means in elevation about said second axis.

7. A scanning device comprising directive antenna means, means for mounting said antenna means for rotation about a first axis rigidly fixed with respect to the directive axis of said antenna means, a yoke, means for pivotally mounting said first axis in said yoke for oscillation about a second axis perpendicular to said first axis, means for rotatably mounting said yoke about a third axis perpendicular to said second axis, means for rotating said yoke about said third axis and for oscillating said first axis about said second axis while maintaining said antenna means stationary with respect to said first axis, means for stopping said rotation and oscillation at a predetermined orientation of said antenna means and for simultaneously initiating rotation of said antenna means about said first axis, means for adjusting the orientation of said antenna means in elevation about said second axis, and means for adjusting the orientation of said antenna means in azimuth about said third axis.

8. A scanning device, comprising directing antenna means, means for mounting said antenna means for rotation about a first axis fixed with respect to the directivity axis of said antenna means, means for pivotally mounting said first axis for oscillation about a second axis perpendicular to said first axis, means for rotatably mounting said second axis about a third axis perpendicular to said second axis, means for rotating said antenna means about said third axis and for oscillating said first axis about second axis while maintaining said antenna means stationary with respect to said first axis, and means for stopping said rotation and oscillation at a predetermined orientation of said antenna means and for simultaneously initiating rotation of said antenna means about said first axis.

9. A scanning device comprising directive antenna means, means for mounting said antenna means for rotation about a first axis, means for oscillating said first axis about a second axis, means for spinning said second axis about a third axis while maintaining said antenna means stationary with respect to said first axis, means for interrupting said spinning and oscillation and for initiating rotation about said first axis, and means for adjusting the orientation of said first axis about said second axis.

10. A scanning device as in claim 9, further including means for adjusting the orientation of said antenna means about said third axis.

11. A scanning device comprising directive antenna means, means for nodding said antenna means about a nod axis, means for simultaneously spinning said antenna means about a spin axis, and means for interrupting said nod motion while maintaining a spin motion of said antenna means.

12. A scanning device as in claim 11, further including means for adjusting the position of said antenna means about said nod axis.

13. A scanning device as in claim 11, further including means for adjusting the position of said antenna means about said spin axis.

14. A scanning device as in claim 11, further including means for adjusting the position of said antenna means about said nod and spin axis.

15. A scanning device as in claim 11, further including means for converting said nod axis to an elevation axis and for adjusting said antenna means about said elevation axis.

16. A scanning device as in claim 11, further including means for converting said spin axis to an azimuth axis, and means for adjusting said antenna means in azimuth about said azimuth axis.

17. A scanning device as in claim 11, further including means for converting said nod axis to an elevation axis and said spin axis to an azimuth axis, and for adjusting said antenna means in elevation and azimuth about said axis.

18. A scanning device comprising orientable means, means for nodding said orientable means about a nod axis, means for simultaneously spinning said orientable means about a spin axis, and means for interrupting said nod motion while maintaining a spin motion of said orientable means.

19. A scanning device comprising a directive antenna adapted to radiate a lobe of radiant energy, first scanning means operative on said antenna to sweep said lobe recurrently through a first predetermined path confined within a solid angle, and second scanning means operative on said antenna to sweep said lobe recurrently through a second predetermined path confined within a second solid angle.

20. A scanning device comprising a directive antenna adapted to radiate a lobe of radiant energy, comprising first scanning means operative on said antenna to sweep said lobe recurrently in a path generating a spiral cone, and second scanning means operative when said first scanning means is inoperative to sweep said lobe recurrently in a path generating a relatively slender circular cone of fixed apex angle.

21. Apparatus comprising an orientable device adapted to project a lobe of energy, first scanning means operative on said device to sweep said lobe recurrently through a spiral conical path, second scanning means operative on said device to sweep said lobe through a small circular arc, power means for actuating said scanners, and means for rendering one of said scanners inoperative while the other is operative.

22. A directive antenna adapted to scan a space confined within a solid angle, comprising a paraboloidal radiant energy reflector, means for spinning said reflector continuously about a first axis, means for oscillating said reflector about a transverse axis, and means for locating said reflector at predetermined positions about said transverse axis.

23. Scanning means comprising a paraboloidal reflector, means for spinning said reflector about an axis initially substantially aligned with the axis of said reflector, and means for oscillating said reflector axis through a limited arc from said spin axis about a transverse axis.

24. A scanning device comprising a directive antenna adapted to project a lobe of radiant energy and power means for sweeping said lobe through a solid angle in space, and braking means responsive to energy reflected from an irradiated object for stopping the motion of said lobe when said lobe is directed substantially on said object.

25. A scanning device comprising a directive antenna adapted to project a lobe of radiant energy, first scanning means adapted to sweep said lobe through successive portions of a solid angle in space, second scanning means operative when said first scanning means is inoperative, to sweep said lobe through a narrow zone of said solid angle, and control means responsive to radiant energy reflected from a scanned object adapted to render said first scanning means inoperative.

26. A scanning device comprising a directive antenna adapted to project a lobe of radiant energy, first scanning means adapted to sweep said lobe through successive portions of a solid angle in space, second scanning means operative when said first scanning means is inoperative, to sweep said lobe through a narrow zone of said solid angle, a control device having a directional indicator adjustable to predetermined positions denoting the successive positions of said lobe, and means actuated by said control device for rendering said first scanning means inoperative when said lobe reaches a predetermined position relative to said indicator.

27. A scanning device comprising a paraboloidal reflector adapted to radiate a lobe of energy, means for sweeping said reflector so as to project said lobe through successive portions of a solid angle, and means for spinning said reflector about a fixed axis eccentrically disposed with respect to said lobe, but substantially aligned with the axis of said reflector.

28. In the method of scanning, the steps comprising revolving and oscillating the directive axis of an energy radiator through successive portions of a solid angle in space to locate a target, and upon receiving radiant energy reflected from said target, confining the sweeping motion of said radiator to a relatively narrow solid angle adapted to enclose said target.

29. In the method of locating and tracking targets, the steps comprising sweeping the directive axis of an energy radiator through successive portions of a solid angle to locate a target therein, discontinuing such sweeping movement so as to locate said axis substantially on said target in response to radiant energy reflected along said axis from said target, and thereupon sweeping said directive axis about an axis eccentric to said directive axis so that the directive axis generates a cone of revolution adapted to enclose said target.

LEON A. MAYBARDUK.
WALTER W. MIEHER.
STEPHEN J. ZAND.
GIFFORD E. WHITE.